Patented June 18, 1929.

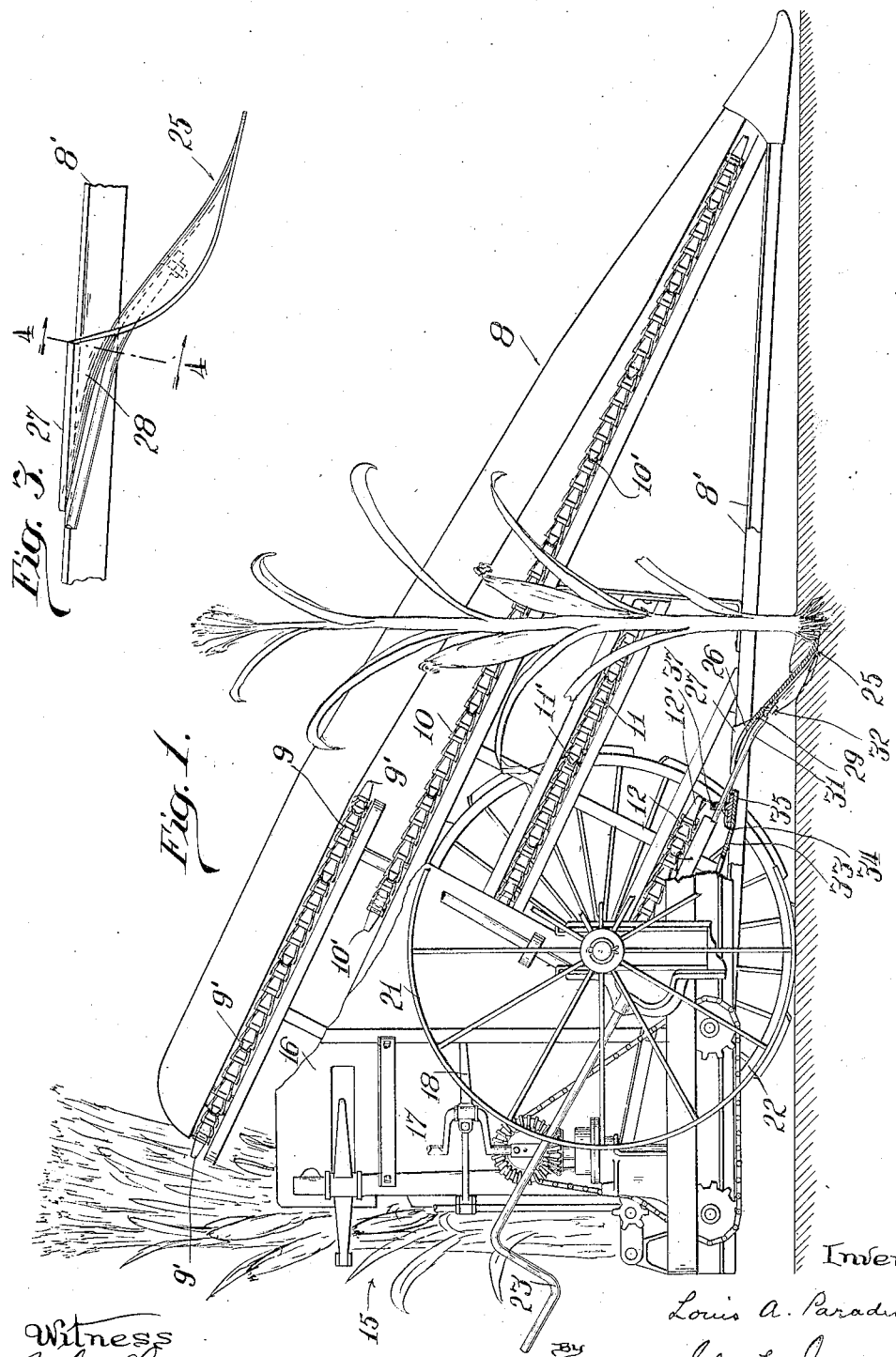

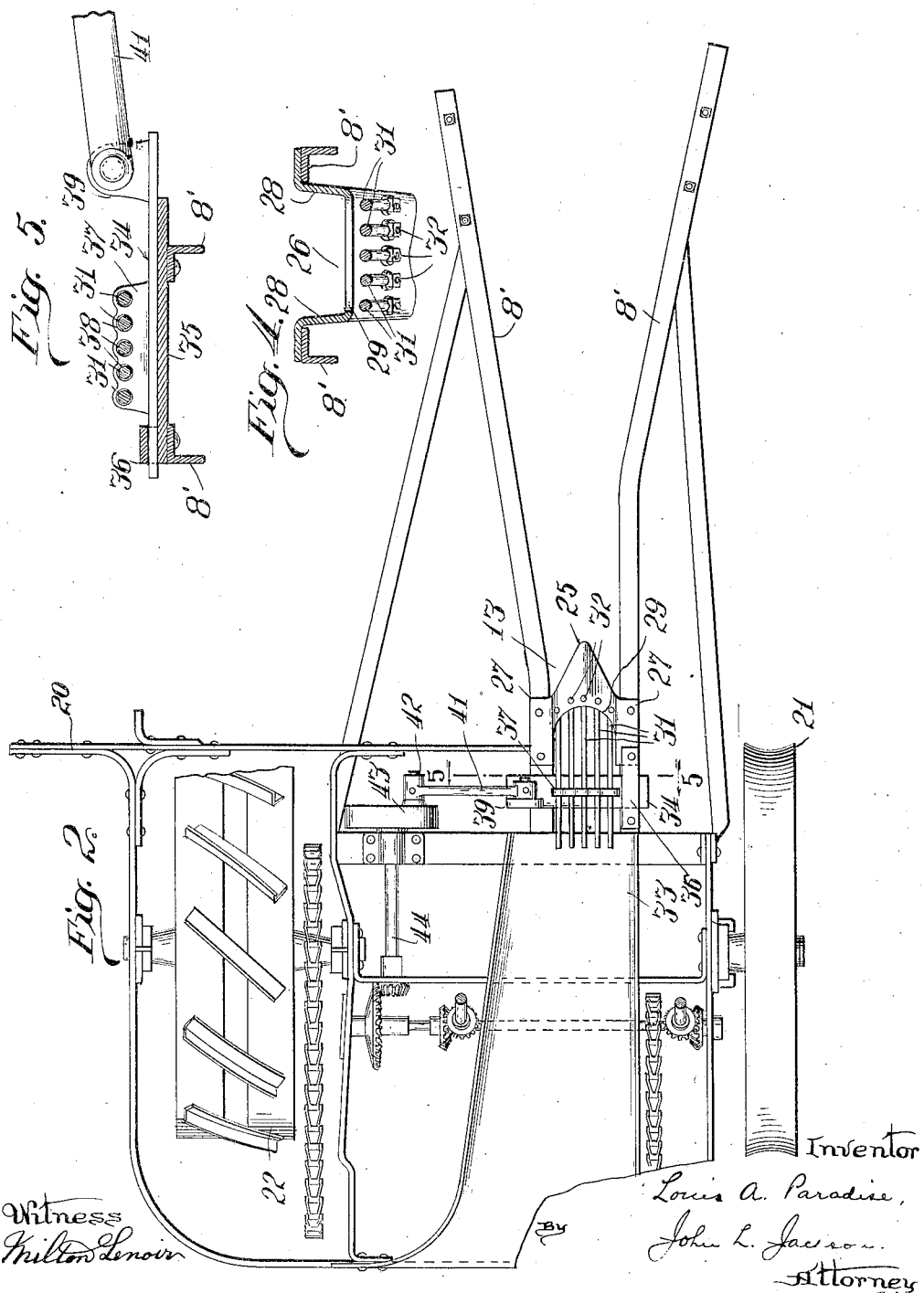

1,717,889

UNITED STATES PATENT OFFICE.

LOUIS A. PARADISE, OF MOLINE, ILLINOIS, ASSIGNOR TO DEERE & COMPANY, OF MOLINE, ILLINOIS, A CORPORATION OF ILLINOIS.

CORN HARVESTER.

Application filed October 2, 1926. Serial No. 139,045.

The present invention relates to corn harvesters, and aims primarily to provide a machine of this class which will cut or remove the entire corn stalk down to ground level, or even below ground level so as virtually to uproot the stalk.

The object in developing a machine which will harvest corn in this manner is to combat the ravaging corn insect commonly known as the corn borer. These insects live and lay their eggs in the lower part of the stalk at or near the ground level, generally in the first joint of the stalk. The present method of cutting the stalks in the standard corn harvester is of no avail for combating the insects. In the conventional corn harvester as now constructed, the stalks are cut off at a height several inches above the ground level which leaves the infested part of the stalk standing in the field. As a result, these corn borers can continue to multiply and soon become so numerous that they are very difficult to exterminate.

Practically all prior types of corn harvesters or binders operate to cut the corn stalks through the slicing action of a reciprocating sickle disposed considerably above ground level. The adjustments generally provided on these machines to raise and lower the height of the sickle bar are inadequate to enable the sickle to be disposed at a sufficiently low point to remove the infested part of the stalk. Even if it were possible to dispose the sickle sufficiently low to remove the entire stalk its operation at this point would be impracticable because of dirt engaging with the sickle knives.

In providing a corn harvester which will perform the above operation of removing or uprooting the entire stalk I employ an improved stalk engaging element which functions much in the manner of a plow and of a cutter, operating to uproot the stalk, and to cut or break any long roots tending to prevent removal thereof. In the preferred manner of operating the machine, this stalk engaging element travels below the top of the soil, splitting the center of the corn hill or corn row, similarly to the action of a middle breaker. Although, this element is in continuous contact with the ground there are no moving parts nor other fragile elements which are likely to be injured by such contact with the soil.

Another feature of the invention resides in improved means for shaking the soil from the butt ends and roots of the stalks before they pass to the binder or such other mechanisms as operate thereon. By thus shaking and separating the clods of earth from the stalks and roots there is avoided the possibility of large clods of earth interfering with the binding of the stalks into a compact bundle. Furthermore, this improved apparatus minimizes the possibility of this dirt being carried into the operating parts of the packer and binder mechanism and on to the bundle carrying mechanism where it might tend to clog or produce rapid wear in these mechanisms.

Other objects and advantages of the invention will be apparent from the following detailed description of a preferred embodiment thereof.

In the drawings accompanying this description:

Figure 1 is a side elevational view of a corn harvester embodying my invention, a portion of the near gatherer arm and adjacent wheel being broken away to show the location of the stalk engaging element and the vibrating grating.

Fig. 2 is a plan view of the present harvester, showing somewhat schematically the principal parts of the harvester mechanism.

Fig. 3 is a side elevational view of the stalk engaging element and vibrator, on a larger scale.

Fig. 4 is a transverse sectional view through the same, taken on the plane of the line 4—4 of Fig. 3, and Fig. 5 is a transverse sectional view taken approximately on the plane of the line 5—5 of Fig. 2.

The frame and main operating parts of the harvester are constructed and arranged in accordance with any standard practice, and therefore I shall only make brief reference to the principal elements of the harvester design, as these are all well known in the art. Two divergent gatherer arms 8—8 generally extend from the fore-part of the machine and travel on each side of the corn row to guide the stalks into the machine. It is customary to provide each of these gatherer arms with a plurality of moving chains 9, 10, 11 and 12 tracking along the inner sides of the arms and carrying projecting lugs 9', 10', 11' and 12' which feed the stalks into the throat 13 formed between the converging ends of the gatherer arms, and which loosely hold the stalks upright from the time that they are uprooted until they are conveyed to the rear part of the machine. The majority of these corn harvesting machines are provided with binding mechanism for binding the stalks together in bundle form, and when thus equipped the machines are generally referred to as corn binders. The present invention is applicable to either type of machine viz one in which the stalks are merely cut or removed and then discharged loosely from the machine, or one in which the stalks are bound into bundle form after cutting. A conventional form of binding mechanism is indicated at 15, the binder head being shown at 16 and the packer shaft and packer arms at 17 and 18 respectively. The chains 9, 11 and 12 convey the stalks from the throat 13 to this binder mechanism. Various forms of discharge mechanism are employed in different types of machines for discharging the bundles from the machine, some of these devices operating in the nature of ejectors and others consisting of a bundle carrier or elevator for discharging the bundles stubbleward or into a wagon moving alongside the harvester.

The main body of the machine is supported on inner and outer wheels 21 and 22, which are generally referred to as the grain wheel and the drive wheel respectively. The draft attachment is generally connected to the laterally extending portion of the frame on the stubbleward side of the machine, indicated at 20. It is customary to drive all operating parts of the machine from the drive wheel 22 through different trains of transmission mechanism all operatively connected with the drive wheel. The bearing of each wheel 21 and 22 is adjustably supported in the vehicle frame, whereby the frame may be raised or lowered relative to the ground level. A typical operating member for effecting the adjustment of the grain wheel is indicated at 23, the full showing of the actuating parts of this adjusting mechanism being omitted for the reason that this adjustment is old in the art.

Referring now to the particular details of the present invention, the improved means for cutting and uprooting the corn stalks consists of a plow shaped element 25 disposed in the throat portion 13 between the gatherer arms and having its plowing point disposed to engage the corn stalks either at the surface of the ground or preferably slightly below the surface. Figs. 3 and 4 illustrate in detail the preferred construction of this plow member. The forward portion thereof is pointed and wedge shaped, and this portion is ridged or arched along the longitudinal center thereof to give this forward portion a raised central ridge and downwardly sloping side surfaces.

The rear portion of this member is widened to form a trough shaped passageway 26 and to provide lateral attaching flanges 27. These attaching flanges are riveted or bolted to angle bars 8' constituting the lower structural portion of the gatherer arms 8. As best shown in Fig. 4, it will be observed that the side portions of the plow element curve upwardly above the plane of the longitudinal ridge in the fore part of the element and thus form side walls 28 for the passageway 26. The intermediate portion between these side flanges is left open as indicated at 29, the forward end of this opening being preferably curved as shown at Fig. 2. A vibrating screen or grating, preferably consisting of a series of longitudinally extending rods 31, extends rearwardly in this opening. Such rods or bars 31 are disposed substantially parallel and have eyes or other suitable pivot connections at their front ends which are pivotally connected to the underside of the plow member at the front curved edge of the opening 29 by bolts or rivets 32. The rear ends of the rods 31 extend over the front edge of a pan 33 which leads back to the binder mechanism. It will be observed from the foregoing that these bars define a grating or slotted surface extending from the front end of the opening 29 to the front end of the pan 33 through which loosened soil can fall from the butt ends and roots of the stalks down to the ground below. This grating is vibrated through the reciprocating motion of a cross slide 34 which slides on a plate 35 secured to the upper sides of the angle bars 8'. A strap 36 may extend across one end of the slide to hold the same in its guided path. Extending upwardly from this slide or cross bar is a flange 37 having openings 38 therein through which extend the rods 31. The holes 38 are slightly larger in diameter than the rods 31 to permit angular motion of the rods therein incident to the vibrating movement of the slide. A pivot lug 39 extends upwardly from the inner end of the slide, and to this is pivoted one end of a connecting rod 41. The other end of the connecting rod is pivoted to a crank pin 42 extending from the face of a crank disk 43. This crank disk is mounted on a shaft 44 suitably journaled in bearings carried by the frame of the machine and adapted to be driven through one of the driving trains connecting to the bull wheel 22. The aforesaid crank mechanism consisting of the shaft 44, disk 43 and crank pin 42 corresponds in general arrangement and location to the crank mechanism ordinarily employed for operating the sickle bar of the conventional harvester, from which it will be seen that the adaptation of the present invention to a standard type of harvester involves comparatively little alteration in the general design thereof. In the operation of the machine, the frame thereof is lowered through actuation of the adjusting handles 23 to dispose the cutter or plow element 25 at the desired height, either approximately at or below ground level. Preferably, this element should enter the ground a short distance, as in such position it is certain to remove all infested parts of the corn stalk. Moreover, by disposing this harvesting element below ground level it will always remove substantially the entire stalk even if there are undulations in the hill or row. Furthermore, by engaging the stalk at this point the endwise pressure of the plow member against the stalk will not tend to tip the stalk because of the restraint offered by the surrounding soil to such tipping. At the time that the plow member engages the stalk, the upper part of the latter is, of course, under the restraining influence of the conveyor chains so that the stalk is also held against any tipping or inclination by these chains. These chains travel along the gatherer arms at substantially the ground speed of the harvester. After the stalk has been uprooted it is conveyed rearwardly by these chains, the butt end and roots of the stalk sliding upwardly over the plow member onto the vibrating grating 31.

As the plow member moves through the ground the stalk, by virtue of the guiding restraint of the gatherer arms and chains, will be compelled to slide up over the plow member, but the loose earth will be free to fall to either side of the plow member down along the sloping sides of the front wedge portion thereof, the plow member opening the corn row much in the nature of a middle breaker. Hence when the stalks reach the vibrating grating, the only soil which it will be necessary to separate therefrom will be the soil actually clinging to the butt ends and roots. In the movement of the stalk lengthwise of this vibrating grating the weight of the entire stalk is imposed on its lower end, thus pressing the clods of earth adhering thereto down against the grating rods so that the latter will effectively break up the clods and drop the loosened soil on to the ground below. After the stalks pass over this grating they are conveyed back to the binder mechanism 15 by the guiding and conveying chains 9—12.

When the machine is traveling to or from the field, the plow member is of course raised above ground level by elevating the main frame of the machine through actuation of the adjusting handles 23. A suitable clutch will also be interposed in the driving train leading to the crank disk 43 so that the vibration of the grating 30 can also be interrupted at such times.

I wish it to be understood that my invention is not limited to the specific embodiment thereof illustrated and described, but is generic in character and includes such alterations or modifications as may occur to those skilled in the art. So far as I am aware, no one has heretofore proposed to provide a corn harvester or binder with means for removing the stalks from the ground substantially in their entirety, through a plowing operation as described.

What I claim as my invention and desire to secure by Letters Patent, is—

1. A corn harvester comprising a frame, a bull wheel supporting part of said frame, a plow member carried by said frame and adapted to travel longitudinally of the corn row below the surface of the soil for uprooting the corn stalks, a passageway extending from said plow member to adjacent the discharge point of the harvester through which the stalks are adapted to travel, said passageway having an opening therein, a plurality of vibratory rods pivotally supported in said opening, crank means driven from said bull wheel, and a connecting rod between said crank means and said vibratory rods for actuating the latter.

2. In a corn harvester, the combination of a pair of forwardly extending gatherer arms, gatherer chains traveling rearwardly along the inner sides of said arms, said chains being spaced laterally from each other and arranged to effect travel of the stalks in the machine without the stalks being gripped between said chains, and plow means for uprooting the stalks while the latter are under the guiding restraint of said chains.

3. In a corn harvester, the combination of a pair of forwardly extending gatherer arms, a plurality of vertically spaced gatherer chains on the inner side of each arm, said chains having lugs thereon arranged to effect rearward guided travel of the stalks in the machine without the stalks being gripped between said chains, and a plow arranged to uproot the stalks while the latter are under the guiding restraint of said chains.

4. In a corn harvester, the combination of a pair of gatherer members, a plow disposed between said gatherer members for uprooting the corn stalks, and conveying chains on the inner sides of said gatherer members adapted to loosely hold the stalks against falling during the uprooting operation and arranged to convey the stalks to the rear portion of the machine.

5. In a corn harvester, the combination of a pair of laterally spaced gatherer members, a plow disposed between said gatherer members and adapted to uproot the corn stalks, a supporting surface extending rearwardly from said plow and on which the butt ends of the stalks rest after being uprooted by said plow, and continuously moving endless conveying members on said gatherer members adapted loosely to support each stalk prior to and while it is being uprooted and to convey the same rearwardly along said supporting surface.

6. In a corn harvester, the combination of a pair of laterally spaced gatherer members, a plow disposed between said gatherer members and adapted to uproot the corn stalks, a supporting surface extending rearwardly from said plow and on which the butt ends of the stalks rest after being uprooted by said plow, continuously moving endless conveying members on said gatherer members adapted loosely to support each stalk prior to and while it is being uprooted and to convey the same rearwardly along said supporting surface, and a vibrating grating in said supporting surface for shaking the soil from the butt ends of the stalks.

7. In a corn harvester, the combination of a pair of forwardly extending gatherer arms, gatherer chains traveling rearwardly upon the inner sides of said arms, said chains being permanently spaced laterally from each other and arranged to effect guided travel of the stalks in the machine without the stalks being gripped between said chains, a plow member adapted to uproot the corn stalks, said gatherer arms and gatherer chains extending forwardly from said plow member to be in supporting relation to each stalk at the time it is uprooted, said plow member having a raised central ridge and downwardly sloping side portions adapted to open the center of the corn row and to turn the soil to both sides of said plow member in the operation of uprooting said stalks, and a supporting surface extending rearwardly from said plow member and on which the butt ends of the stalks rest while said stalks are being conveyed to the rear portion of the implement.

8. In a corn harvester, the combination of a pair of forwardly extending gatherer arms, gatherer chains traveling rearwardly along the inner sides of said arms, said chains being maintained in laterally spaced relation and arranged to effect guided travel of the stalks in the machine without the stalks being gripped between said chains, a plow member disposed adjacent to the throat portion of said gatherer arms, said plow member comprising a front portion having a raised longitudinally extending central ridge and downwardly sloping side portions, and comprising a rear portion having upwardly extending side portions for guiding the lower ends of the stalks into the machine after they have been uprooted by the said front portion, a vibrating grating associated with the rear portion of said plow member for shaking the soil loose from the stalks, and a pan extending rearwardly from said vibrating grating and on which the butt ends of said stalks rest while said stalks are being conveyed to the rear portion of the machine.

9. In a corn harvester, the combination of a wheeled frame, a plow carried by said frame and adapted to travel longitudinally of the corn row below the surface of the soil for uprooting the stalks, two laterally spaced gatherer arms extending forwardly beyond said plow member for guiding the corn stalks thereto, endless flexible conveyors traveling longitudinally along the inner side of one of said gatherer arms adapted to loosely support the stalks against falling, and means mounted on said frame in rear of said plow for removing the soil from the butt ends of the uprooted stalks, said endless conveyors engaging the stalks before they are uprooted by said plow and affording a continuous feed of successive stalks from said plow to said soil removing means whereby the implement can harvest with a continuous forward motion.

10. In a corn harvester, the combination of a wheeled frame, a plow carried by said frame and adapted to travel longitudinally of the corn row below the surface of the soil for uprooting the stalks, two laterally spaced gatherer arms extending forwardly beyond said plow member for guiding the corn stalks thereto, continuously moving endless chains traveling longitudinally along the inner sides of both of said gatherer arms in laterally spaced relation and having lugs thereon adapted to loosely support the stalks against falling, and transversely vibrating means mounted on said frame in rear of said plow and on which the butt ends of said stalks are adapted to bear under their own weight for having adhering soil removed therefrom, said endless chains engaging the stalks before they are uprooted by said plow and affording a continuous feed of successive stalks from said plow to said soil removing means substantially at the ground speed of the implement whereby the implement can harvest with a continuous forward motion.

11. In a corn harvester, the combination of plow means for uprooting the stalks, conveying mechanism adapted to loosely support the stalks against falling while they are being uprooted and to convey the same rearwardly in the implement from the plow means, and means for supporting the weight of the stalks independently of said conveying mechanism while the stalks are being conveyed thereby.

12. In a corn harvester, the combination of a pair of gatherer members, a plow disposed between said gatherer members for uprooting the corn stalks, conveying chains on the inner sides of said gatherer members adapted to loosely hold the stalks against falling during the uprooting operation and arranged to convey the stalks to the rear portion of the machine, and a vibrating grating between said gatherer members for shaking the soil from the butt ends of the stalks.

13. In a corn harvester, the combination of a pair of gatherer members, a plow disposed between said gatherer members for uprooting the corn stalks, conveying chains on the inner sides of said gatherer members adapted to loosely hold the stalks against falling during the uprooting operation and arranged to convey the stalks to the rear portion of the machine, and means mounted at the rear of said plow for removing the soil from the butt ends of the uprooted stalks.

14. In a corn harvester, the combination of plow means for uprooting the stalks, conveying mechanism adapted to loosely support the stalks against falling while they are being uprooted and to convey the same rearwardly in the implement from the plow means, and means for supporting the weight of the stalks independently of said conveying mechanism while the stalks are being conveyed thereby, said latter means including means for removing soil adhering to the stalks.

15. In a corn harvester, the combination of plow means for uprooting the stalks, conveying mechanism adapted to loosely support the stalks against falling while they are being uprooted and to convey the same rearwardly in the implement from the plow means, and means for supporting the weight of the stalks independently of said conveying mechanism while the stalks are being conveyed thereby, said latter means including a vibrating grating through which soil adhering to the stalks may fall.

16. In a corn harvester, the combination of plow means for uprooting the stalks, conveying mechanism adapted to loosely support the stalks against falling while they are being uprooted and to convey the same rearwardly in the implement from the plow means, and means for supporting the weight of the stalks independently of said conveying mechanism while the stalks are being conveyed thereby, said supporting means being of openwork construction to permit soil loosened from said stalks to fall therethrough.

LOUIS A. PARADISE.